United States Patent

Hao et al.

Patent Number: 6,028,844
Date of Patent: *Feb. 22, 2000

[54] ATM RECEIVER

[75] Inventors: Yi-Hsien Hao, Saratoga; Paul H. Scott, San Jose, both of Calif.

[73] Assignee: Cypress Semiconductor Corp., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/599,509

[22] Filed: Jan. 25, 1996

[51] Int. Cl.[7] ............................. H04L 1/00; G06F 11/00
[52] U.S. Cl. .................... 370/242; 370/392; 370/395; 371/37.12
[58] Field of Search .................................. 370/242, 392, 370/395, 419, 474, 409; 371/30, 35, 373.01, 37.7, 37.07, 37.12

[56] References Cited

U.S. PATENT DOCUMENTS

| 4,512,011 | 4/1985 | Turner ...................................... 370/409 |
| 5,249,178 | 9/1993 | Kurano et al. .......................... 370/392 |
| 5,513,191 | 4/1996 | Takechi et al. ........................ 371/37.1 |
| 5,566,170 | 10/1996 | Bakke et al. ............................. 370/392 |
| 5,600,653 | 2/1997 | Chitre et al. ............................ 370/474 |

*Primary Examiner*—William Luther
*Attorney, Agent, or Firm*—Blakely, Sokoloff, Taylor & Zafman LLP

[57] ABSTRACT

An Asynchronous Transfer Mode ATM receiver is disclosed. The ATM receiver comprises an input that receives an ATM cell. A first-in first-out (FIFO) is coupled to the input. The FIFO stores the ATM cell received from the input. A header error correction (HEC) checking circuit is coupled to the input. The HEC checking circuit starts to check a header in the ATM cell for an error at substantially the same time when the ATM cell is being stored in the FIFO.

13 Claims, 6 Drawing Sheets

ATM RECEIVER

FIELD OF THE INVENTION

The present invention relates to Asynchronous Transfer Mode (ATM) receivers in computer systems. More specifically, the present invention relates to an improved apparatus and method for receiving and verifying ATM cells.

BACKGROUND OF THE INVENTION

ATM is a cell-based switching and multiplexing technology designed to be a general-purpose, connection-oriented transfer mode for a wide range of services. ATM handles both connection-oriented traffic directly or through adaptation layers, or connectionless traffic through the use of adaptation layers. ATM virtual connections may operate at either a Constant Bit Rate (CBR) or a Variable Bit Rate (VBR). Each ATM cell sent into the network contains addressing information that establishes a virtual connection from origination to destination. All cells are then transferred, in sequence, over this virtual connection. ATM provides either Permanent or Switched Virtual Connections (PVCs or SVCs). ATM is asynchronous because the transmitted cells need not be periodic as time slots of data are in Synchronous Transfer Mode (STM).

ATM offers the potential to standardize on one network architecture defining the multiplexing and switching method, with SONET/STM providing the basis for physical transmission standard for very high-speed rates. ATM also supports multiple Quality of Service classes for differing application requirements on delay and loss performance. Thus, the vision of ATM is that an entire network can be constructed using ATM and ATM Application Layers switching and multiplexing principles to support a wide range of all services, such as: voice, packet data (SMDS, IP, FR), video, imaging, and circuit emulation. ATM provides bandwidth-on-demand through the use of SVCs, and also supports LAN-like access to available bandwidth.

The primary unit in ATM is the cell. FIG. 1 illustrates an ATM cell 100 transmitted over transmission path 110. ATM defines a fixed-size cell with a length of 53 bytes comprised of a 5 byte header 101 and a 48 byte payload 102. Cells are mapped into a physical transmission path, such as the North American DS1, DS3, or SONET; European, E1, E3, and E4; or ITU-T STM standards; and various local fiber and electrical transmission payloads. All information is switched and multiplexed in an ATM network in these fixed-length cells. The cell header identifies the destination, cell type, and priority. The Virtual Path Identifier (VPI) 104 and Virtual Channel Identifier (VCI) 105 hold local significance only, and identify the destination. The Generic Flow Control (GFC) 103 field allows a multiplexer to control the rate of an ATM terminal. The Payload Type (PT) 106 indicates whether the cell contains user data, signaling data, or maintenance information. The Cell Loss Priority (CLP) 107 bit indicates the relative priority of the cell. Lower priority cells are discarded before higher priority cells during congested intervals.

Because of the critical nature of the information in the ATM cell header, ATM receivers use a Header Error Control (HEC) field 108 to detect and correct errors in the header. The payload field is passed through the network intact, with no error checking or correction. ATM relies on higher layer protocols to perform error checking and correction on the payload. The fixed cell size simplifies the implementation of ATM switches and multiplexers and enables implementation at very high speeds.

In the past, receiver units checked the 5 bytes in the header of the ATM cell and corrected any single bit error in the header before writing the ATM cell into a FIFO memory. If the header was not corrupted, the entire ATM cell was written into the FIFO memory. If a single bit error was in the header, the error would be corrected before writing the ATM cell into the FIFO memory. However, if there was a multiple bit error in the header, the header would not be correctable and the entire ATM cell would not be written into the FIFO. While the receiver checked the status of the header, the ATM cell was stored in a buffer. The result of this was that a latency period of 5 cycles was required to check the header and correct any error before the ATM cell was written into the FIFO.

SUMMARY AND OBJECTS OF THE INVENTION

One object of the present invention is to provide an ATM receiver which reduces the latency period before storing an ATM cell into a FIFO memory when checking the header of an ATM cell for errors.

Another object of the present invention is to provide an ATM receiver which starts to check the header of an ATM cell at substantially the same time as when the ATM cell is being stored into the FIFO memory.

Another object of the present invention is to provide an ATM receiver which records the location of an error in the header of the ATM cell.

A further object of the present invention is to provide an ATM receiver which corrects the header of an ATM cell after it is read from a FIFO memory.

An Asynchronous Transfer Mode ATM receiver is described. The ATM receiver comprises an input that receives an ATM cell. A FIFO memory is coupled to the input. The FIFO memory stores the ATM cell received from the input. A HEC checking circuit is coupled to the input. The HEC checking circuit starts to check a header in the ATM cell for an error at substantially the same time when the ATM cell is being stored in the FIFO memory.

A method for receiving and verifying an ATM cell is also described. The method includes the steps of writing the ATM cell in a FIFO memory and checking the header of the ATM cell for an error while the ATM cell is being written into the FIFO memory.

Other objects, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

A novel ATM receiver is disclosed. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Figure 1:
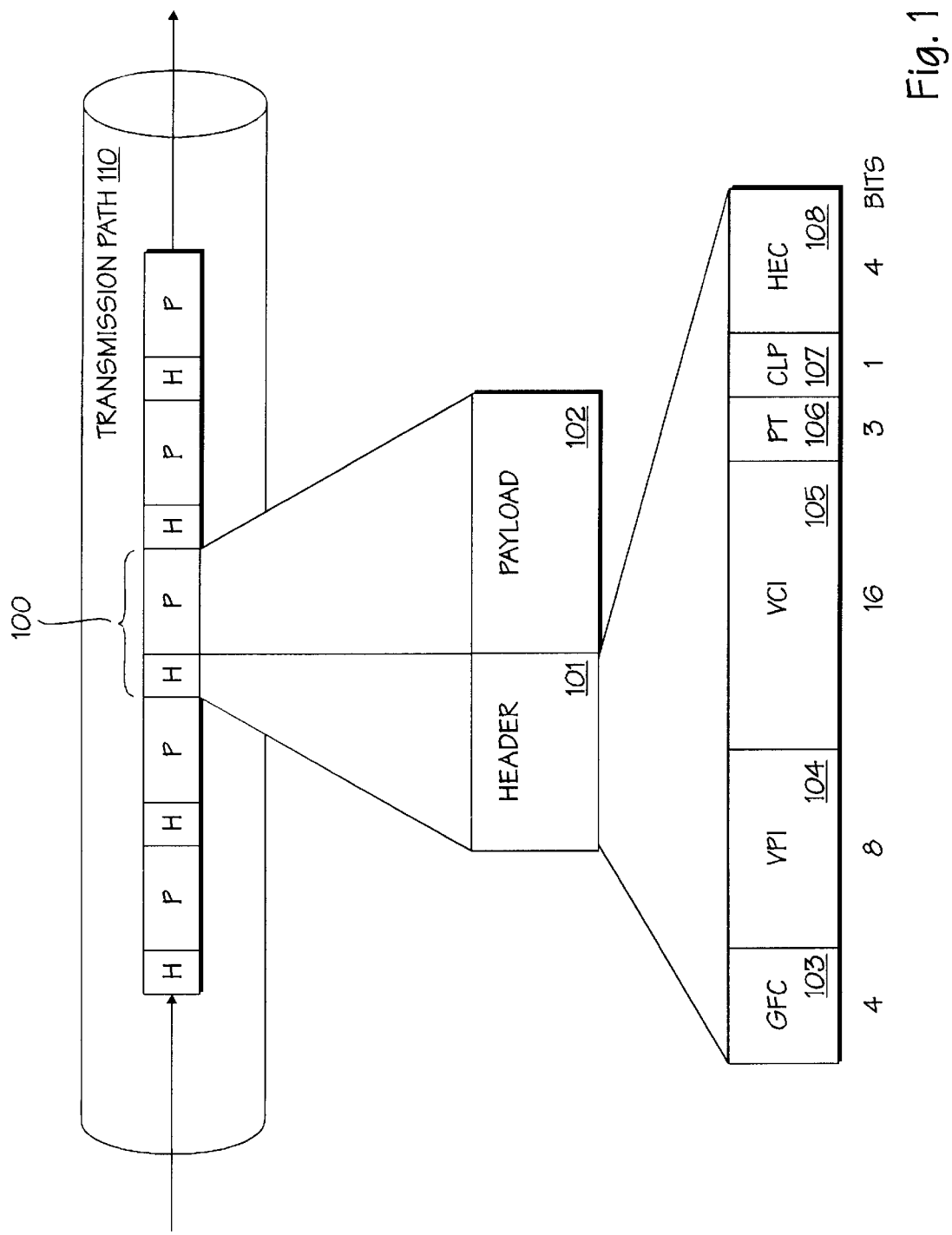
FIG. 1 illustrates the format of an ATM cell.
Figure 2:
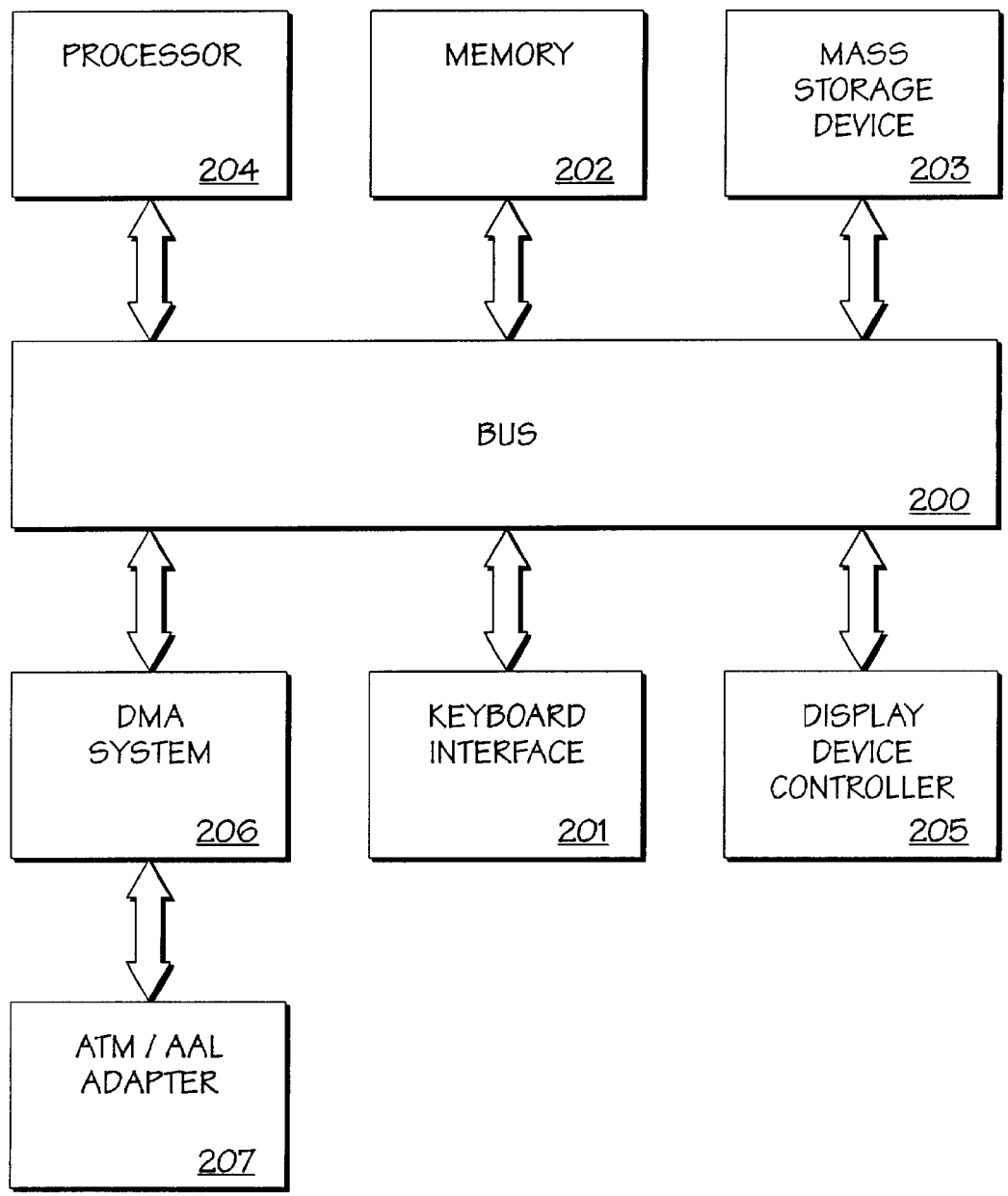
FIG. 2 illustrates an embodiment of the present invention as implemented in a computer system.

FIG. 2 illustrates in block diagram form a computer system of one embodiment of the present invention. The computer system comprises bus 200, keyboard interface 201, external memory 202, mass storage device 203, processor 204, display device controller 205, direct memory access (DMA) system 206, and ATM/ATM adaptation layer (AAL) adapter 207. Bus 200 is coupled to display device controller 205, keyboard interface 201, microprocessor 204, memory 202 mass storage device 203, and direct memory access (DMA) system 206.

Bus 200 can be a single bus or a combination of multiple buses. As an example, bus 200 can comprise an Industry Standard Architectural (ISA) bus, an Extended Industry Standard Architecture (EISA) bus, a system bus, a X-bus, micro-channel bus, a Peripheral Components Interconnect (PCI) bus, a Personal Computer Memory Card International Association (PCMCIA) bus or other buses. Bus 200 can also comprise a combination of any of these buses. Bus 200 provides communication links between components in the computer system. Keyboard interface 201 can be a keyboard controller or other keyboard interface. Keyboard interface 201 can be a dedicated device or can reside in another device such as a bus controller or other controller. Keyboard interface 201 allows coupling of a keyboard to the computer system and transmits signals from a keyboard to the computer system. External memory 202 can comprise a dynamic random access memory (DRAM) device, a static random access memory (SRAM) device, or other memory devices. External memory 202 stores information and data from mass storage device 203 and processor 204 for use by processor 204. Mass storage device 203 can be a hard disk drive, a floppy disk drive, a CD-ROM device, a flash memory device or other mass storage device. Mass storage device 203 provides information and data to external memory 202.

Processor 204 processes information and data from external memory 202 and stores information and data into external memory 202. Processor 204 also receives signals from keyboard controller 201 and transmits information and data to display device controller 205 for display on a display device. Processor 204 also transmits video images to the display device controller 205 for display on a display device. Processor 204 can be a complex instruction set computing (CISC) microprocessor, a reduced instruction set computing (RISC) microprocessor, a very long instruction word (VLIW) microprocessor or other processor device. Display device controller 205 allows coupling of a display device to the computer system and acts as an interface between the display device and the computer system. Display device controller 205 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 204 through display device controller 205 and displays the information and data to the user of the computer system.

ATM/AAL adapter 207 operates to connect the computer system to an ATM network. ATM/AAL adapter comprises a segmentation and reassembly (SAR) integrated circuit that interfaces with a physical layer, ATM layer, and a ATM adaptation layer. DMA system 206 receives an entire packet from the SAR integrated circuit so that processor 204 is not involved in the physical, ATM, or ATM adaptation layer functions. Processor 204 is interrupted when a packet is received, causing a switch to the communications task, which sets up the DMA transfer. The DMA system 206 then transfers the packet data across bus 200 to memory 202, during which time the processor remains idle. The processor 204 allocates buffers for the packet data and processes the packet header allowing it to be placed in the corresponding logical queue.

Figure 3:
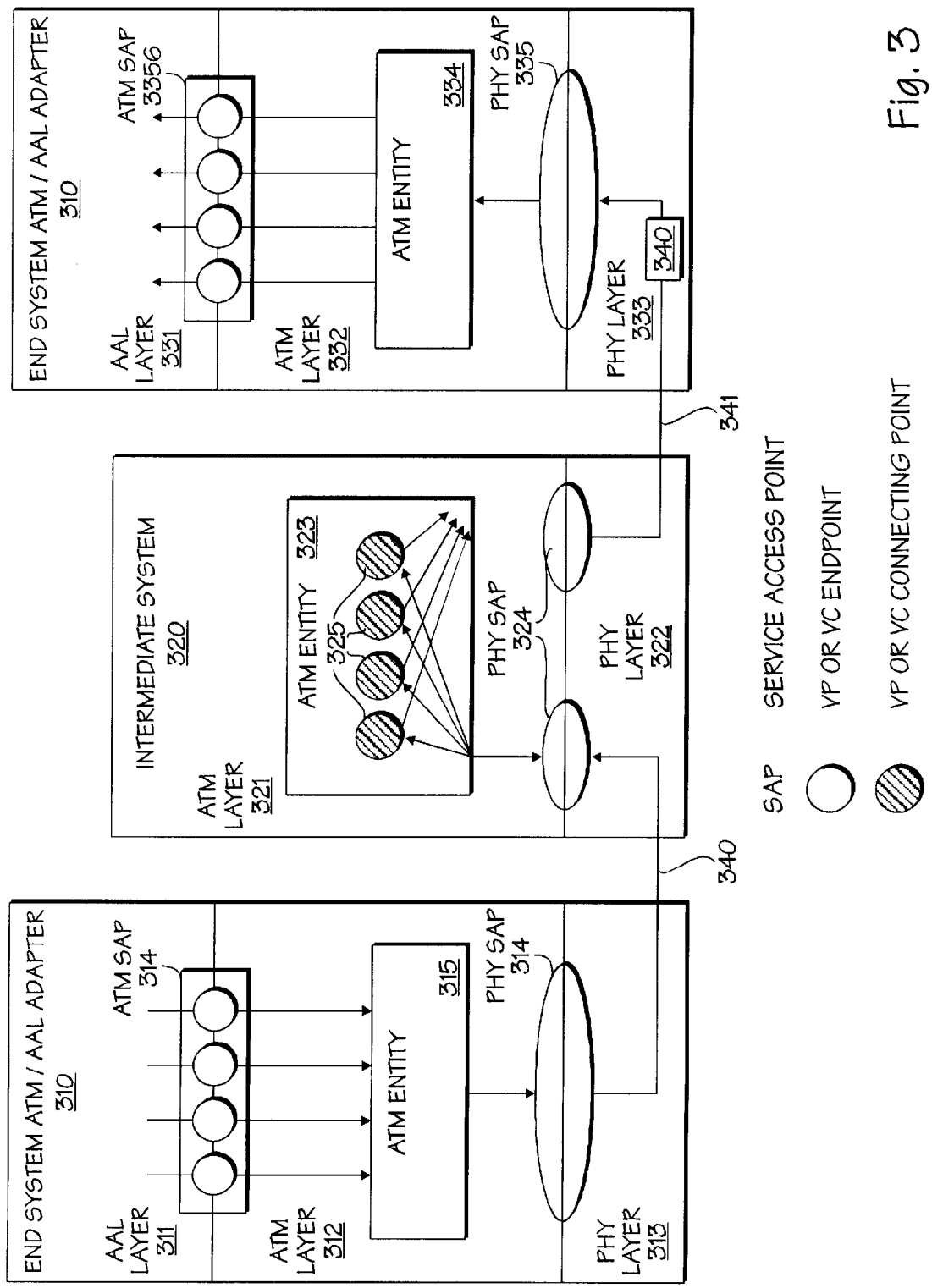
FIG. 3 illustrates two endpoint ATM/AAL adapters connected by an intermediate system.

FIG. 3 illustrates two end system ATM/AAL adapters 310 and 207 connected by an intermediate system 320. End system ATM/AAL adapters 310 and 207 are identical and reside in separate computer systems. FIG. 3 illustrates how an ATM cell is transmitted from end system ATM/AAL adapter 310 to end system ATM/AAL adapter 207. End system ATM/AAL adapter 310 comprises an ATM adaptation layer 311, ATM layer 312, and a physical layer 313. ATM adaptation layer 311 generates cell payloads for a number of connection endpoints at the boundary between the ATM adaptation layer and the ATM layer called the ATM service access point 314. An ATM entity 315 in ATM layer 312 multiplexes these virtual connections and passes ATM cells to the physical layer at an interface called the physical layer service access point 316. The bit stream is passed between the physical layer 313 in end system ATM/AAL adapter 310 and the physical layer 322 in intermediate system 320 over physical interface 340.

Intermediate system 320 comprises an ATM layer 321 and a physical layer 322. The intermediate system 320 demultiplexes the ATM connections and applies each to one of a plurality of connecting points 325 in a intermediate system ATM entity 323 located in the ATM layer 321. The connecting points 325 in the ATM entity translates Virtual Path Connection and/or the Virtual Channel Identifier depending on whether the ATM connection is a Virtual Path or Virtual Channel connecting point. The connecting points 325 determine the outgoing physical interface and performs other ATM layer functions. The intermediate system ATM entity 323 multiplexes these onto the outgoing physical layer service access point 324 for transfer to the destination, end system ATM/AAL adapter 207. The bit stream is passed between the physical layer 322 of intermediate system 320 and the physical layer 333 of end system ATM/AAL adapter 207 over physical interface 341.

End system ATM/AAL adapter 207 comprises ATM adaptation layer 331, ATM layer 332, and physical layer 333. ATM cells are first sent to ATM receiver 340 in physical layer 333. ATM receiver 340 operates to check the header of each ATM cell for errors. ATM receiver 340 checks the header of an ATM cell while storing or writing the ATM cell into a FIFO in receiver 340. If a single error is found in the header of the ATM cell, ATM receiver 340 records the location of the error in a error recording register. The error in the header is corrected upon a request to read the ATM cell from the FIFO. If a plurality of errors is found in the header of the ATM cell, ATM receiver 340 backs up the write pointer in the FIFO. The ATM cell is allowed to be written over and is not allowed to be read from the FIFO. ATM receiver 340 delivers these ATM cells to ATM entity 334 via physical layer service access point 335. End system ATM entity 334 demultiplexes the cells and delivers the cells to the endpoint of the corresponding Virtual Paths or Virtual Circuits via ATM service access point 336.

Figure 4:
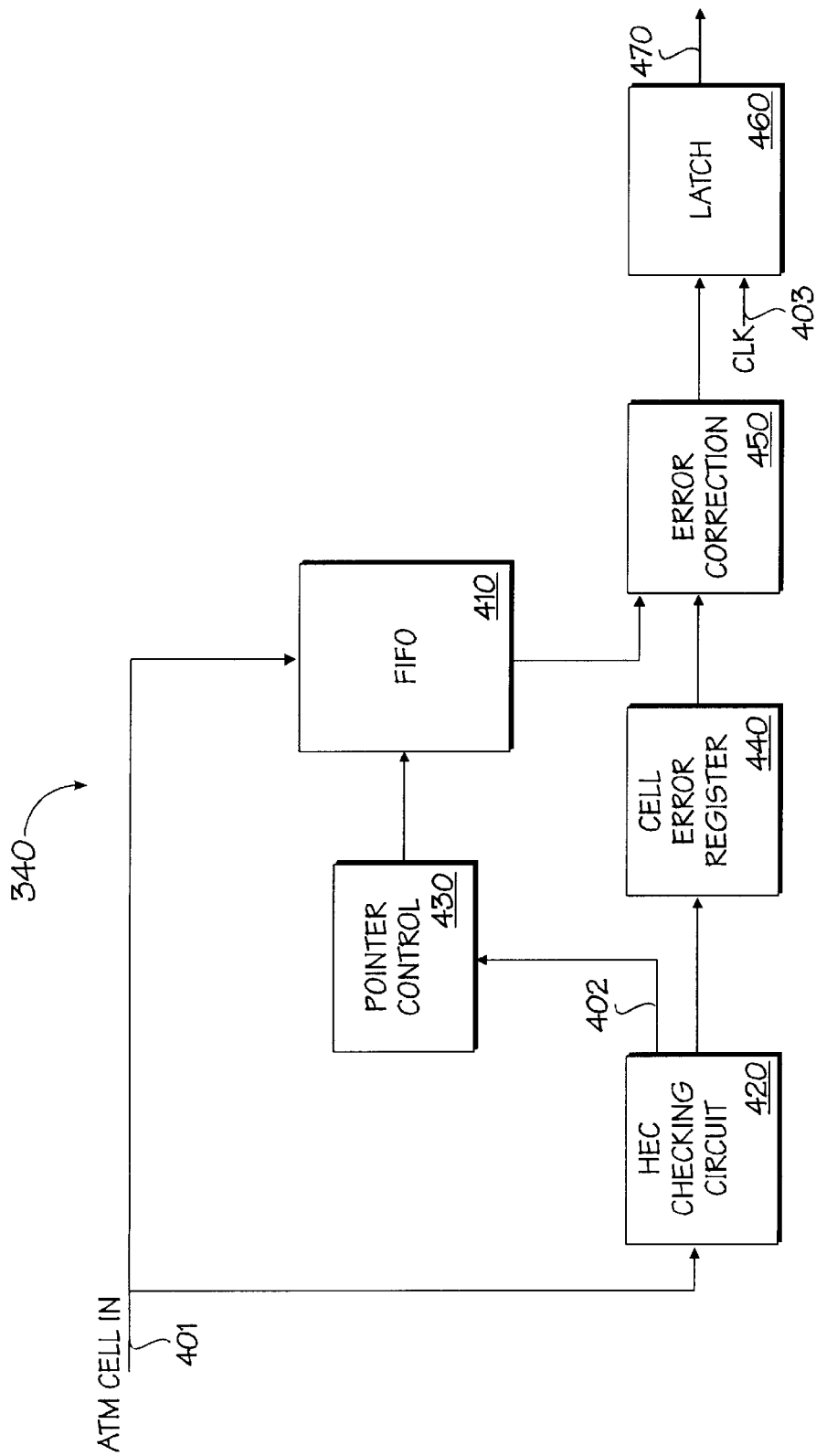
FIG. 4 illustrates an embodiment of the ATM receiver according to one embodiment of the present invention.

FIG. 4 illustrates one embodiment of ATM receiver 340. ATM receiver 340 comprises FIFO memory 410, HEC checking circuit 420, pointer control circuit 430, cell error register 440, error correction circuit 450, and latch 460. Input 401 receives an ATM cell from an external source. Input 401 may be, for example, physical interface 341. The external source may be, for example, the physical layer 322 of an intermediate system 341.

A FIFO memory is coupled to input 401. FIFO memory 410 is constructed to store a plurality of ATM cells. FIFO memory 410 has a write pointer which keeps track of the memory location which was previously written onto. The write pointer directs where in the memory a next ATM cell is to be stored. FIFO memory 410 has a read pointer which keeps track of the memory location which was previously accessed. The read pointer directs which portion of the memory should be accessed during a next read. In a preferred embodiment, FIFO memory 410 can store 4 ATM cells. FIFO memory 410 may be implemented by any known circuitry.

HEC checking circuit 420 is coupled to input 401. HEC checking circuit 420 operates to check the header of an ATM cell. HEC checking circuit 420 calculates a value for the first four bytes of the cell header and compares it with a previous value calculated for the first four bytes of the header and inserted in the HEC field by a transceiver in ATM/AAL adapter 310. In one embodiment of the present invention, the cyclic redundancy check (CRC) algorithm is used to generate the value in the HEC field. The CRC algorithm generates a value for the HEC field which equals the value of the remainder of the division (modulo 2) by the generator polynomial $x^8+x^2+x+1$ of the polynomial $x^8$ multiplied by the content of the header excluding the HEC field and XORed with the value 01010101 is XORed. HEC checking circuit 420 starts checking the header in the ATM cell at substantially the same time as when the ATM cell is being stored in FIFO memory 410.

If a single error is found in the header of the ATM cell, the error is correctable. HEC checking circuit records whether there is a single error in the ATM cell and the location of the single error in cell error register 440. If, however, a multiple bit error is found in the header of the ATM cell, the error is not correctable. HEC checking circuit 420 outputs a multiple error signal to pointer control circuit 430 through line 402. HEC checking circuit 420 may be implemented by any known circuitry.

Pointer control circuit 430 is coupled to HEC checking circuit 420 and FIFO memory 410. Pointer control circuit 430 backs up the write pointer in FIFO memory 410 in response to receiving a multiple error signal from HEC checking circuit 420. As a result, the location in FIFO memory 410 which is used to store the ATM cell is allowed to be written over with a next ATM cell. This is desirable since multiple-bit errors are not correctable and an ATM cell with multiple-bit errors in its header should not be sent to the ATM layer. Pointer control circuit 430 may be implemented by any known circuitry.

Cell error register 440 is coupled to HEC checking circuit 420 and records information regarding the status of the header of the ATM cell. Cell error register 440 records whether the ATM cell has a single bit error and where this error can be found in the header. In a preferred embodiment of the present invention, cell error register allocates a 6-bit field for indicating the location of the error. In one embodiment of the present invention. the location of the error can be indicated by using those six bits to point to any one bit location in the header. In another embodiment of the present invention, a first three bits of the six bits can be used to indicate which byte in the header has the error and the next three bits of the six bits can be used to indicate which bit in the byte has the error. In the preferred embodiment of the present invention, cell error register 440 can record information regarding the status of the header of 4 ATM cells. Cell error register 440 may be implemented by any known circuitry.

Error correction circuit 450 is coupled to FIFO memory 410 and cell error register 440. Error correction circuit 450 receives the ATM cell from FIFO memory 410 and information regarding the status of the header of the ATM cell. If the header of the ATM cell is errorless, error correction circuit 450 passes the ATM cell to latch circuit 460. If the header of the ATM cell contains a single bit error, error correction unit 450 corrects the single bit error at the location of the error before passing the ATM cell to latch circuit 460. In the preferred embodiment of the present invention, error correction unit 450 comprises a XOR gate for correcting the single bit error. Error correction unit 450 may be implemented by any known circuitry.

Latch circuit 460 is coupled to error correction circuit 450 and a clock signal from line 403. Latch circuit 460 receives the ATM cell from error correction circuit 450 and outputs the ATM cell onto data bus 470 in response to a clock signal from line 403. Data bus 470 connects receiver 340 to the physical service access point 335 in the ATM/AAL adapter 207. Latch circuit 460 may be implemented by a known circuitry.

ATM receiver 340 reduces the latency period before storing an ATM cell into a FIFO memory when checking the header of an ATM cell of prior art receivers by sending data directly into FIFO memory 410 while the 5 bytes of the header is being checked. If there is a single bit error in the header of the ATM cell, the status of the header and the error of the single bit error is recorded in cell error register 440. When the upper ATM layer 332 is ready to receive the ATM cell, FIFO memory 410 sends the ATM cell to error correction circuit 450 and cell error register 440 sends the status of the header of the ATM cell to error correction circuit 450. Error correction circuit 450 corrects any single bit error in the header of the ATM cell after the ATM cell is read from the FIFO memory 410. If multiple bit errors exist in the header of the ATM cell, HEC checking circuit 420 sends a signal to pointer control circuit 430. Pointer control circuit 430 resets the write pointer in FIFO memory 410 which allows the ATM cell to be written over by a next ATM cell.

ATM receiver 340 may operate without an error correcting feature. In an embodiment of the present invention without an error correcting feature, ATM receiver 340 comprises an input line for receiving an ATM cell. A FIFO memory is coupled to the input line for storing the ATM cell. An HEC checking circuit is coupled to the input line for checking the header of the ATM cell. The HEC checking circuit checks the header in the ATM cell at substantially the same time as when the ATM cell is being stored in the FIFO memory. If an error is found in the header of the ATM cell, the ATM cell is not forwarded to the data bus to be transmitted to the ATM layer. A pointer control circuit coupled to the HEC checking circuit and the FIFO memory resets the write pointer in the FIFO memory in response to an error signal from the HEC checking circuit. Resetting the write pointer in the FIFO memory allows a next ATM cell to be rewritten over the ATM cell.

It should be appreciated that the ATM receiver described in FIG. 4 may also be used for error correction of data in a format different than ATM cells. The implementation of a checking circuit which performs a checking operation specific to the data can be used in place of HEC checking circuit 420.

Figure 5:
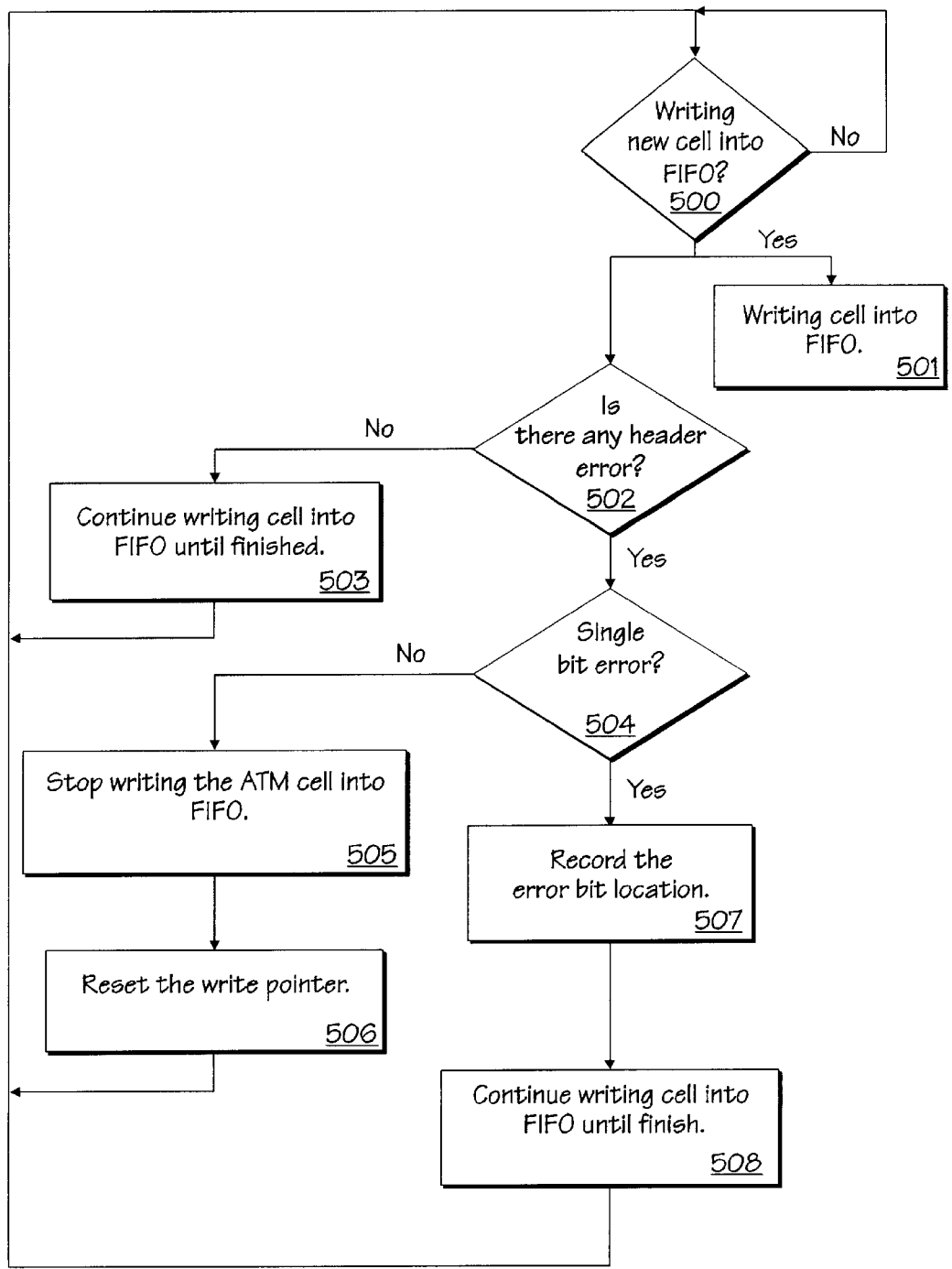
FIG. 5 is a flow chart illustrating a method of receiving ATM cells during a FIFO write operation according to one embodiment of the present invention.

FIG. 5 is a flow chart illustrating a method for receiving and verifying an ATM cell during a FIFO write operation according to one embodiment of the present invention. At step 500, it is determined whether an ATM cell is to be written into a FIFO memory. If an ATM cell is not to be written into a FIFO memory, control returns to step 500. If an ATM cell is to be written into a FIFO memory, control proceeds to step 501 and 502 at substantially the same time.

At step 501, writing of the ATM cell into the FIFO memory is begun.

At step 502, it is determined whether the header of the ATM cell has an error. The error checking starts at substantially the same time as when the ATM cell is being written into the FIFO memory. If there is no error in the header of the ATM cell, control proceeds to step 503. If there is an error in the header of the ATM cell, control proceeds to step 504.

At step 503, writing of the ATM cell into the FIFO memory is continued until the ATM cell is completely written into the FIFO memory. Control proceeds to step 500.

At step 504, it is determined whether the error in the header is a single-bit error. If the error is not a single bit error, control proceeds to step 505 If the error is a single bit error, control proceeds to step 507.

At step 505, writing of the ATM cell into the FIFO memory stops.

At step 506, the write pointer is reset to allow the ATM cell to be written over by next ATM cell. Control proceeds to step 500.

At step 507, the error bit location is recorded in a cell error register.

At step 508, writing of the ATM cell into the FIFO memory is continued until the ATM cell is completely written into the FIFO memory. Control proceeds to step 500.

Figure 6:
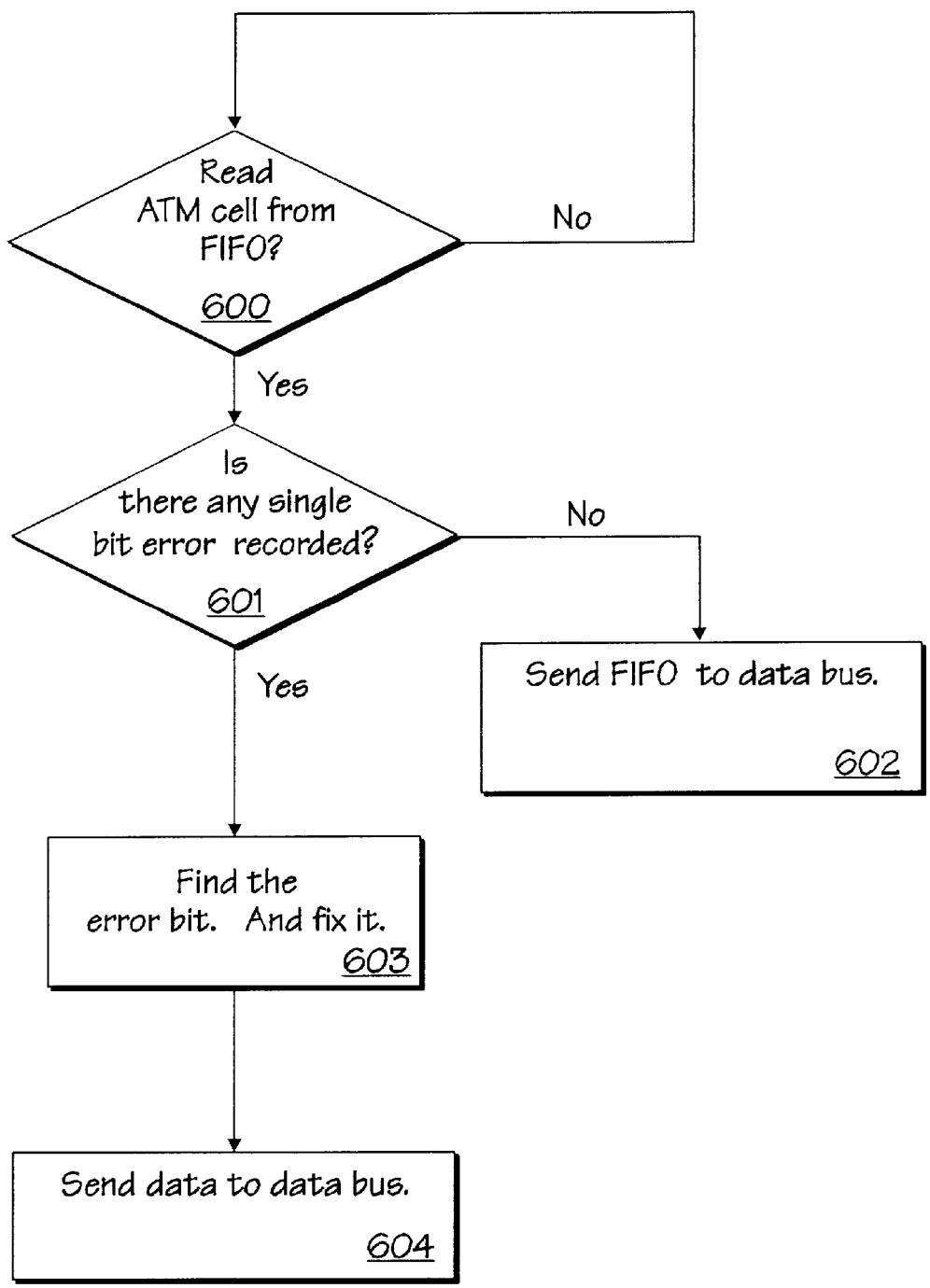
FIG. 6 is a flow chart illustrating a FIFO read operation according to one embodiment of the present invention.

FIG. 6 illustrates a FIFO read operation according to one embodiment of the present invention. At step 600, it is determined whether an ATM cell is to be read from the FIFO memory. If an ATM cell is not to be read from memory, control returns to step 600. If an ATM cell is to be read from the FIFO memory, control proceeds to step 601.

At step 601, it is determined whether there is a single bit error recorded in the cell error register. If there is not a single bit error in the cell error register, control proceeds to step 602. If there is a single bit error recorded in the cell error register, control proceeds to step 603.

At step 602, the ATM cell in the FIFO memory is sent to the data bus.

At step 603, the error bit in the ATM cell header is found and corrected.

At step 604, the ATM cell is sent to the data bus.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A receiver, comprising:

an ATM cell storage unit coupled so as to receive ATM cells from an input of the receiver;

a cell header error checking unit coupled to the input of the receiver in parallel with the ATM cell storage unit and configured to provide multiple bit error signals to the cell storage unit upon detecting a multiple bit error in a received ATM cell; so as to cause the cell storage unit to write over received ATM cells containing multiple bit errors with subsequently received ATM cells and a cell output unit coupled to receive ATM cells from an output of the cell storage unit and header error signals from the cell header error checking unit and configured to automatically correct single bit errors in the ATM cells received from the cell storage unit in response to the header error signals.

2. The receiver of claim 1 wherein the cell storage unit comprises a first-in first-out (FIFO) memory and the multiple bit error signals control signals are provided to a pointer control circuit coupled to the cell header error checking unit and the FIFO memory, the pointer control circuit enabling the FIFO memory to write over received ATM cells containing multiple bit errors with subsequently received ATM cells.

3. The receiver of claim 2, wherein:

the FIFO memory has a write pointer that directs where a next ATM cell is to be stored; and the pointer control circuit backs up the write pointer such that any received ATM cell containing multiple bit errors is written over by a next received ATM cell.

4. The receiver of claim 2, wherein the cell output unit includes a cell error register coupled to the cell header error checking unit receiving a location of a single bit error in the header of a received ATM cell from the cell header error checking unit.

5. An Asynchronous Transfer Mode (ATM) receiver comprising:

a first-in first-out (FIFO) memory configured to store an ATM cell, the FIFO memory having a write pointer that directs where a next ATM cell is to be stored;

a header error control (HEC) checking circuit coupled in parallel with the FIFO memory and configured to check a header of each received ATM cell for errors;

a cell error register coupled to the HEC checking circuit and configured to receive locations of single bit errors in headers of received ATM cells from the HEC checking circuit;

an error correction circuit coupled to the cell error register and the FIFO memory so as to receive ATM cells from the FIFO memory and locations of single bit errors in the headers thereof from the cell error register, the error correction circuit being configured to correct such errors; and a pointer control circuit coupled to the HEC checking circuit and the FIFO memory, the pointer control circuit configured to receive a signal from the HEC checking circuit when the header of a received ATM cell contains more than a single bit error, and to back up the write pointer of the FIFO memory in such instances such that the received ATM cell is written over by a next ATM cell within the FIFO memory and the error correction unit does not receive the received ATM cell.

6. The ATM receiver of claim 5 further comprising a latch circuit coupled to the error correction unit and a clock, the latch circuit configured to receive ATM from the error correction unit and to output such cells to a data bus in response to a clock signal from the clock.

7. The ATM receiver of claim 5, wherein the error correction circuit is configured such that it performs an exclusive OR function.

8. The ATM receiver of claim 5, wherein the FIFO memory comprises sufficient storage space to accommodate 4 ATM cells.

9. The ATM receiver of claim 5, wherein the cell error register comprises sufficient storage space to store the location of single bit errors within 4 ATM cells.

10. A method comprising:
    writing an ATM cell into a first-in first-out (FIFO) memory;
    checking a header of the ATM cell for errors while the ATM cell is being written into the FIFO memory;
    if a single bit error is discovered in the checking step, then writing a location of the single bit error register and subsequently correcting the single bit error in the ATM cell when it is read out of the FIFO memory;
    if a multiple bit error is discovered in the checking step, then backing up a write pointer associated with the FIFO memory and subsequently writing over the ATM cell with a later received ATM cell.

11. A method comprising:
    storing a data transmission cell in a first-in first-out (FIFO) memory;
    checking the data transmission cell for an error as the cell is being stored in the FIFO memory; and
    if during the checking the data transmission cell is determined to contain more than one error, then enabling the FIFO memory to write over the data transmission cell with a subsequently received data transmission cell; and
    if during the checking the data transmission cell is determined to contain a single bit error, then writing the location of the single bit error to a cell error register and subsequently correction the single bit error when the data transmission cell is read out of the FIFO memory.

12. The method of claim 11, further comprising writing over the data transmission cell with the subsequently received data transmission cell.

13. The method of claim 11, wherein enabling comprises:
    backing up a write pointer associated with the FIFO memory to a location at which the data transmission cell is stored in the FIFO memory such that the data transmission cell will be written over by the subsequently received data transmission cell.

* * * * *